(12) United States Patent
Capra

(10) Patent No.: US 10,400,398 B2
(45) Date of Patent: Sep. 3, 2019

(54) PADS

(71) Applicant: Enplast Technology LLC, Houston, TX (US)

(72) Inventor: Giovanni Capra, Houston, TX (US)

(73) Assignee: Enplast Technology LLC, Houston, TX (US)

( * ) Notice: Subject to any disclaimer, the term of this patent is extended or adjusted under 35 U.S.C. 154(b) by 229 days.

(21) Appl. No.: 14/959,529

(22) Filed: Dec. 4, 2015

(65) Prior Publication Data

US 2016/0333534 A1 Nov. 17, 2016

Related U.S. Application Data

(60) Provisional application No. 62/160,562, filed on May 12, 2015.

(51) Int. Cl.
| | | |
|---|---|---|
| *E01C 13/00* | (2006.01) |
| *E01C 13/04* | (2006.01) |
| *E01C 13/02* | (2006.01) |
| *A47L 23/26* | (2006.01) |
| *A63H 33/08* | (2006.01) |
| *A47L 23/24* | (2006.01) |

(Continued)

(52) U.S. Cl.
CPC ............ *E01C 13/045* (2013.01); *E01C 13/02* (2013.01); *A47L 23/24* (2013.01); *A47L 23/26* (2013.01); *A47L 23/266* (2013.01); *A63H 33/04* (2013.01); *A63H 33/06* (2013.01); *A63H 33/08* (2013.01); *B32B 3/30* (2013.01); *E01C 2201/16* (2013.01); *E04F 15/02161* (2013.01); *E04F 15/02172* (2013.01); *F16F 1/376* (2013.01); *F16F 1/3737* (2013.01); *Y10T 428/2457* (2015.01)

(58) Field of Classification Search
CPC ...... E01C 13/00; E01C 13/045; F16F 1/3737; F16F 1/376; A63H 33/04; A63H 33/06; A63H 33/08; A47L 23/266; A47L 23/24; A47L 23/26; E04F 15/02172; E04F 15/02161; Y10T 428/2457; B32B 3/30
See application file for complete search history.

(56) References Cited

U.S. PATENT DOCUMENTS

| | | | |
|---|---|---|---|
| 2,571,715 A | * | 10/1951 | Henning ............. B29C 47/0009 428/167 |
| 4,007,307 A | | 2/1977 | Friedrich |

(Continued)

FOREIGN PATENT DOCUMENTS

| | | | |
|---|---|---|---|
| CA | 2268412 | * | 9/2000 |
| CA | 2409637 A1 | | 4/2004 |

(Continued)

OTHER PUBLICATIONS

Internet definition of "parallel".*

(Continued)

*Primary Examiner* — Donald J Loney
(74) *Attorney, Agent, or Firm* — Saul Ewing Arnstein & Lehr LLP; Brian R. Landry

(57) ABSTRACT

One aspect of the invention provides a pad including: a substrate; a first plurality of parallel ridges extending from a first side of the substrate, the first plurality of parallel ridges terminating in longitudinal alternating bevels; and a second plurality of parallel ridges extending from a second side of the substrate.

6 Claims, 12 Drawing Sheets

(51) Int. Cl.

| | |
|---|---|
| F16F 1/373 | (2006.01) |
| A63H 33/04 | (2006.01) |
| F16F 1/376 | (2006.01) |
| B32B 3/30 | (2006.01) |
| A63H 33/06 | (2006.01) |
| E04F 15/02 | (2006.01) |

(56) References Cited

U.S. PATENT DOCUMENTS

| | | | |
|---|---|---|---|
| 4,147,007 A * | 4/1979 | Eppich | F16B 5/07 446/114 |
| 4,228,116 A | 10/1980 | Colombo | |
| 4,637,942 A | 1/1987 | Tomarin | |
| 4,915,299 A | 4/1990 | Harkus | |
| 4,946,719 A | 8/1990 | Dempsey | |
| 5,057,354 A * | 10/1991 | Kunert | B60J 1/02 156/108 |
| 5,383,314 A * | 1/1995 | Rothberg | E02D 31/02 405/43 |
| 5,489,317 A | 2/1996 | Bergevin | |
| 5,605,721 A | 2/1997 | Di Geronimo | |
| 5,614,288 A * | 3/1997 | Bustos | A47F 1/12 211/59.2 |
| 5,848,940 A | 12/1998 | Yamada | |
| 5,976,645 A | 11/1999 | Daluise | |
| 6,375,546 B1 | 4/2002 | Lemieux | |
| 6,723,412 B2 | 4/2004 | Prevost | |
| 6,740,387 B1 | 5/2004 | Lemieux | |
| 7,273,642 B2 | 9/2007 | Prevost | |
| 7,645,501 B2 | 1/2010 | Sawyer | |
| 7,939,144 B2 | 5/2011 | Verleyen | |
| 7,975,452 B2 * | 7/2011 | Wennberg | E04B 1/18 52/589.1 |
| 8,006,460 B2 | 8/2011 | Chen | |
| 8,153,227 B2 | 4/2012 | Stroppiana | |
| 8,291,661 B2 | 10/2012 | Bengry | |
| 8,440,289 B2 * | 5/2013 | De Giuseppe | B32B 3/30 428/156 |
| 8,557,363 B2 | 10/2013 | Van Balen | |
| 8,603,601 B2 | 12/2013 | Sawyer | |
| 8,726,602 B2 | 5/2014 | DeLong | |
| 8,833,028 B2 | 9/2014 | Whispell | |
| 8,968,502 B1 | 3/2015 | Bearden | |
| 2006/0003148 A1 | 1/2006 | Zwynenburg | |
| 2007/0231532 A1 | 10/2007 | Walters | |
| 2009/0197021 A1 | 8/2009 | Jones | |
| 2010/0239790 A1 | 9/2010 | Stricklen | |
| 2011/0123758 A1 | 5/2011 | Pollaud | |
| 2011/0135851 A1 | 6/2011 | Dozeman | |
| 2014/0094543 A1 | 4/2014 | Bloyaert | |
| 2014/0193593 A1 | 7/2014 | Daluise | |
| 2014/0228503 A1 | 8/2014 | Cialone | |
| 2014/0270992 A1 | 9/2014 | Ayers | |
| 2014/0311074 A1 | 10/2014 | Cormier et al. | |
| 2015/0098757 A1 | 4/2015 | Mitchell | |
| 2016/0123021 A1 | 5/2016 | Cormier et al. | |
| 2016/0138275 A1 | 5/2016 | Cormier et al. | |
| 2016/0177562 A1 | 6/2016 | Cormier et al. | |
| 2016/0255898 A1 | 9/2016 | Cormier et al. | |

FOREIGN PATENT DOCUMENTS

| | | |
|---|---|---|
| GB | 2215622 A | 9/1989 |
| WO | WO 2007078296 A1 | 7/2007 |
| WO | WO 2013150459 A1 | 10/2013 |
| WO | WO 2014032102 A1 | 3/2014 |

OTHER PUBLICATIONS

Costco, "EZ-Flex Interlocking Recycled Rubber Floor Tiles", http://www.costco.com/EZ-Flex-Interlocking-Recycled-Rubber-Floor-Til . . . , Apr. 2015.

de Castro, K. C., et al., "Development and Characterization of Post-consumer Rubber Tire Powder, High Density Polyethylene and Ethylene-octene-1Copolymer Ternary Mixtures", Polímeros, vol. 24, n. 6, p. 654-660, 2014.

U.S. Environmental Protection Agency Air and Radiation (6202J), "Composite Wrap for Non-Leaking Pipeline Defects", Lessons Learned from Natural Gas Star Partners, p. 1-11, Oct. 2006.

Evans, A., et al., "The Differences in Post-Consumer Tyre Processing: Ambient vs Cryogenic; Devulcanisation; Pyrolysis", The Waste & Resources Action Programme, p. 1-7, May 2006.

Montagna, L. S., et al., "Evaluation of the Effect of the Incorporation of Rubber Tire Waste Particles on the Properties of PP, HIPS and PP/HIPS Matrices", Polímeros, p. 1-6, 2013.

Schut, J. H., "Wood is Good for Compounding, Sheet & Profile", Plastics Technology, p. 1-5, Mar. 1999.

* cited by examiner

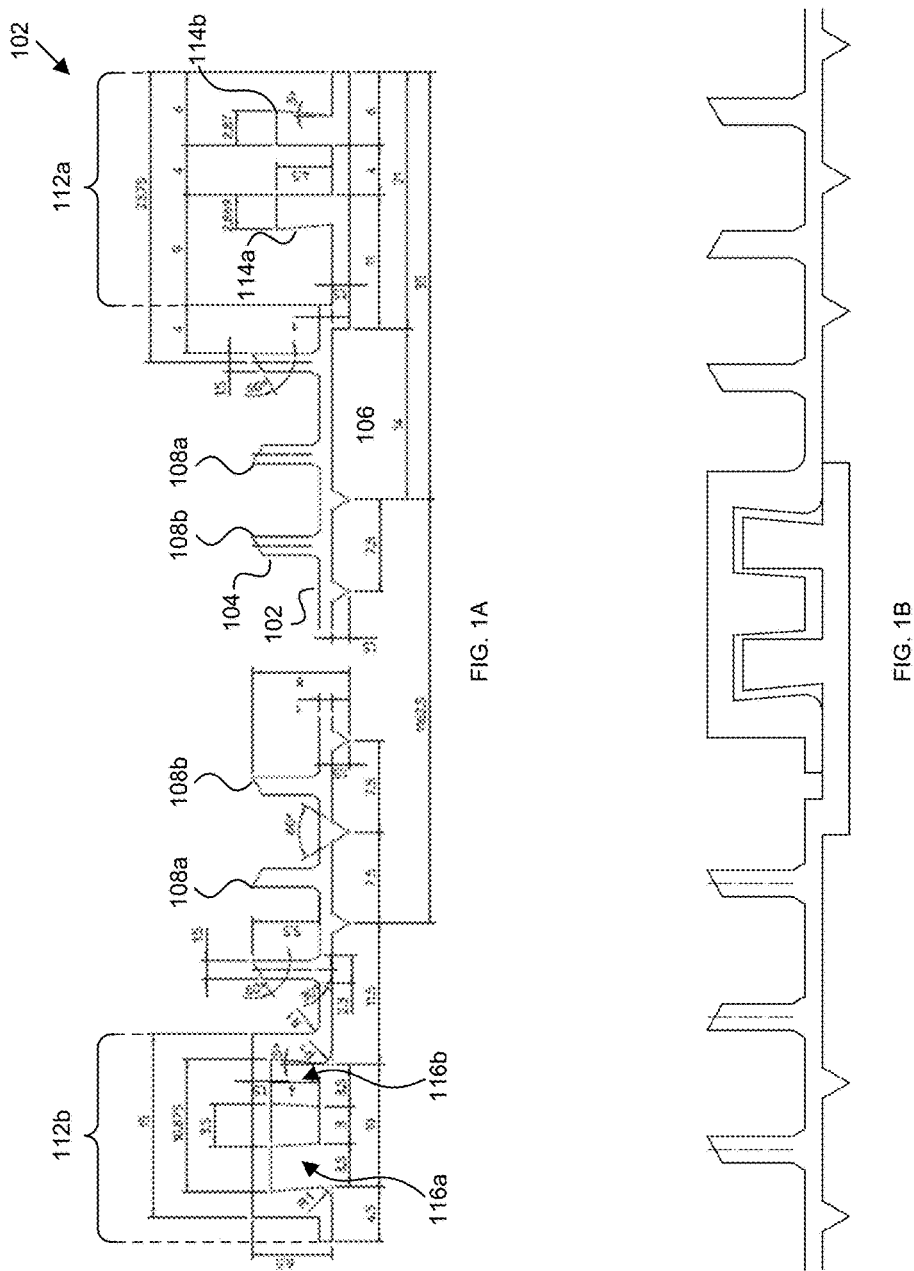

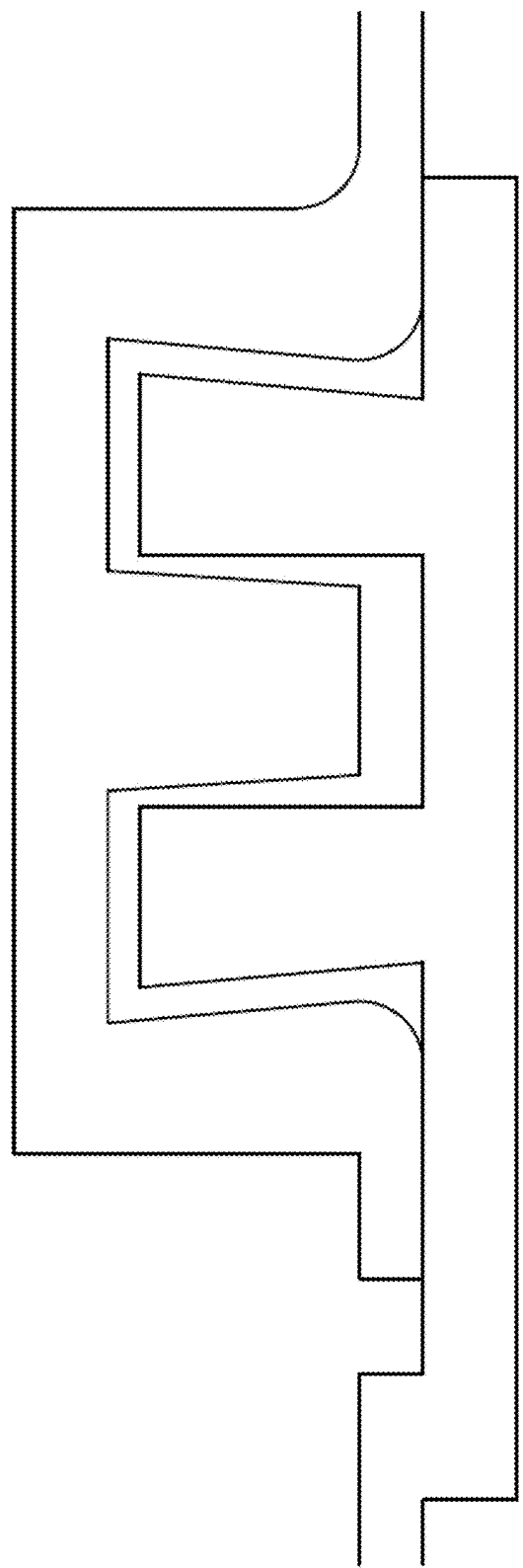

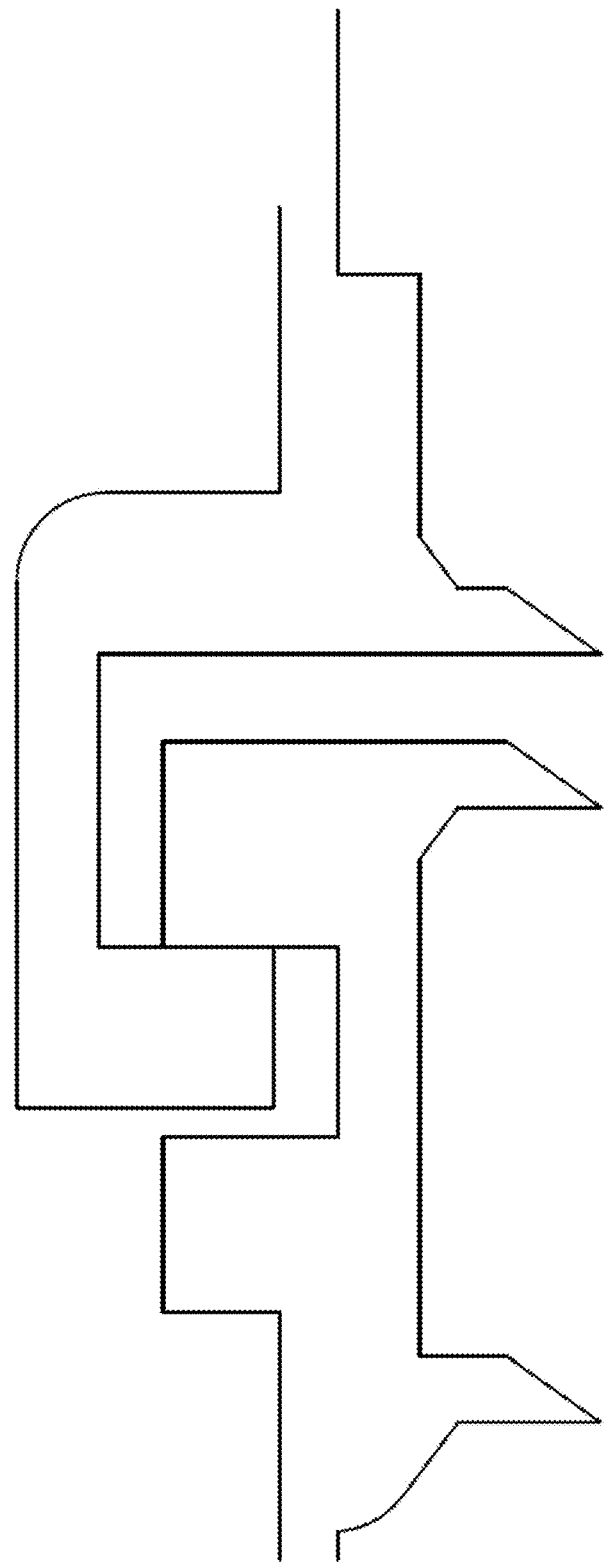

PADS

CROSS-REFERENCE TO RELATED APPLICATIONS

This application claims priority under 35 U.S.C. § 119(e) to U.S. Provisional Patent Application Ser. No. 62/160,562, filed May 12, 2015. The entire content of this application is hereby incorporated by reference herein.

BACKGROUND OF THE INVENTION

Pads are utilized to absorb and/or divert various types of energy and/or substances.

SUMMARY OF THE INVENTION

One aspect of the invention provides a pad including: a substrate; a first plurality of parallel ridges extending from a first side of the substrate, the first plurality of parallel ridges terminating in longitudinal alternating bevels; and a second plurality of parallel ridges extending from a second side of the substrate.

This aspect of the invention can have a variety of embodiments. The second plurality of parallel ridges can have substantially identical profiles terminating in an isosceles triangle. The isosceles triangle can be an equilateral triangle.

The first plurality of parallel ridges can be offset from the second plurality of parallel ridges so that the substrate under the first plurality of ridges can deflect to absorb a load applied to one or more of the first plurality of parallel ridges.

The longitudinal alternating bevels can have an angle with respect to a surface of the substrate of about 30°.

Two edges of the substrate parallel to the first plurality of parallel ridges and the second plurality of parallel edges can include complementary slots and ridges extending in substantially the same direction as the first plurality of parallel ridges, wherein the complementary slots and ridges are adapted and configured to produce a uniform height as the first plurality of ridges upon mating.

The pad can be extruded. The pad can include an extruded polyolefin composite. The polyolefin composite can include post-consumer tire particles. The polyolefin can be polyethylene.

The pad can be sufficiently compliant so as to lie against an underlying surface. The pad can be sufficiently compliant so as to conform to an underlying surface.

At least one of the first plurality of parallel ridges and second plurality of parallel ridges can include periodic breaks allowing water to traverse the ridges.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views. Any dimensions depicted are exemplary and should not be deemed to exclude the use of other dimensions, either of the same or different proportions.

FIGS. 1A-1F depict cross-sectional views of pads according to embodiments of the invention.

DEFINITIONS

Figure 1C:
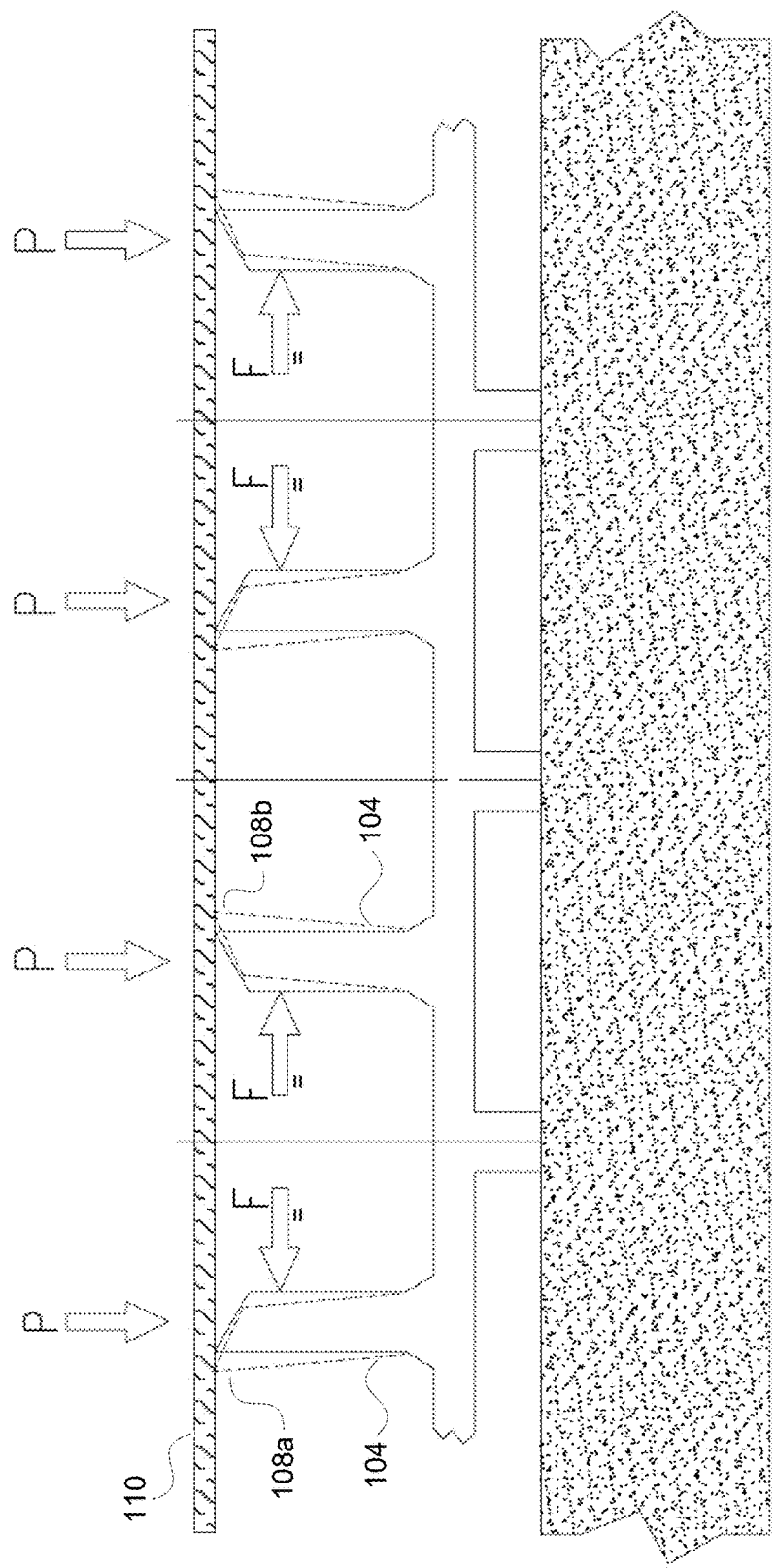
Figure 1F:
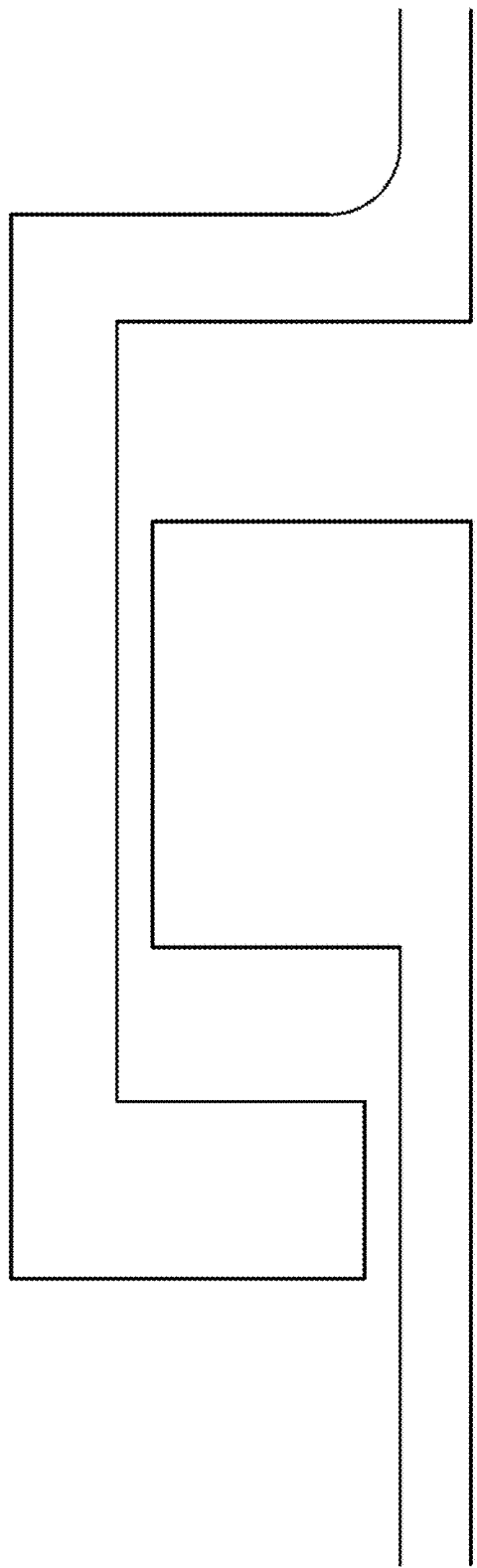

The instant invention is most clearly understood with reference to the following definitions:

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

One aspect of the invention provides pads (including, but not limited to, connectable pads) that are useful, for example, in absorbing and/or diverting various types of energy and/or substances.

Referring now to FIG. 1A, one aspect of the invention provides an impact absorbing pad 100 that can be utilized, for example, under various sports playing surfaces such as artificial turf fields, hard courts, and the like and/or on playgrounds (either under other surfaces or as a top surface). FIG. 1A depicts a cross-section of the pad 100 in which the structure of the substrate 102, upper parallel ridges 104, and lower parallel ridges 106 can be most clearly viewed.

The substrate 102 can be substantially flat, textured, or have other geometric features beyond the upper parallel ridges 104 and lower parallel ridges 106.

The upper parallel ridges 104 can have a variety of geometries. In one embodiment, the upper parallel ridges 104 terminate in longitudinally alternating bevels 108a, 108b. As depicted in FIG. 1B, when pressure P is applied to the upper parallel ridges 104, the upper parallel ridges 104 will deform toward the high side of the longitudinally alternating bevels 108a, 108b. This alternating deformation pattern allows for impact absorption without racking or shifting of the pad 100 and/or any material 110 overlaying the pad 100.

In some embodiments, the longitudinally alternating bevels 108a, 108b have an angle of about 30° with respect to a surface of the substrate of about 60° with respect to the vertical upper parallel ridges 104. However, other angles can be utilized. Preferably, the angles are symmetrical so that parallel deformation of the ridges will occur.

Figure 1G:
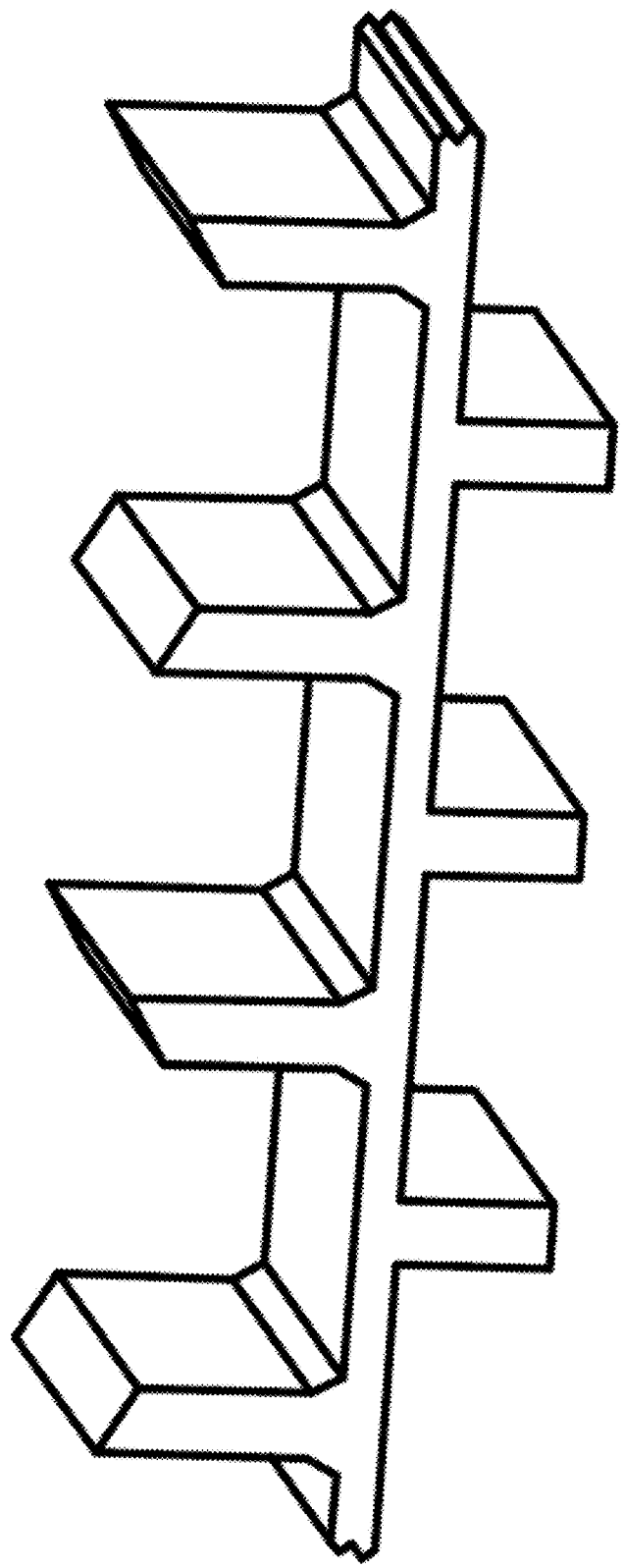
FIG. 1G provides a perspective view of a pad according to embodiment of the invention.
Figure 2A:
FIGS. 2A and 2B depict side views of a pad according to an embodiment of the invention as installed over a prepared surface as underlayment for an artificial turf football field. Although the prototype pad is black, embodiments of the invention can be produced in any desired color.
Figure 2B:
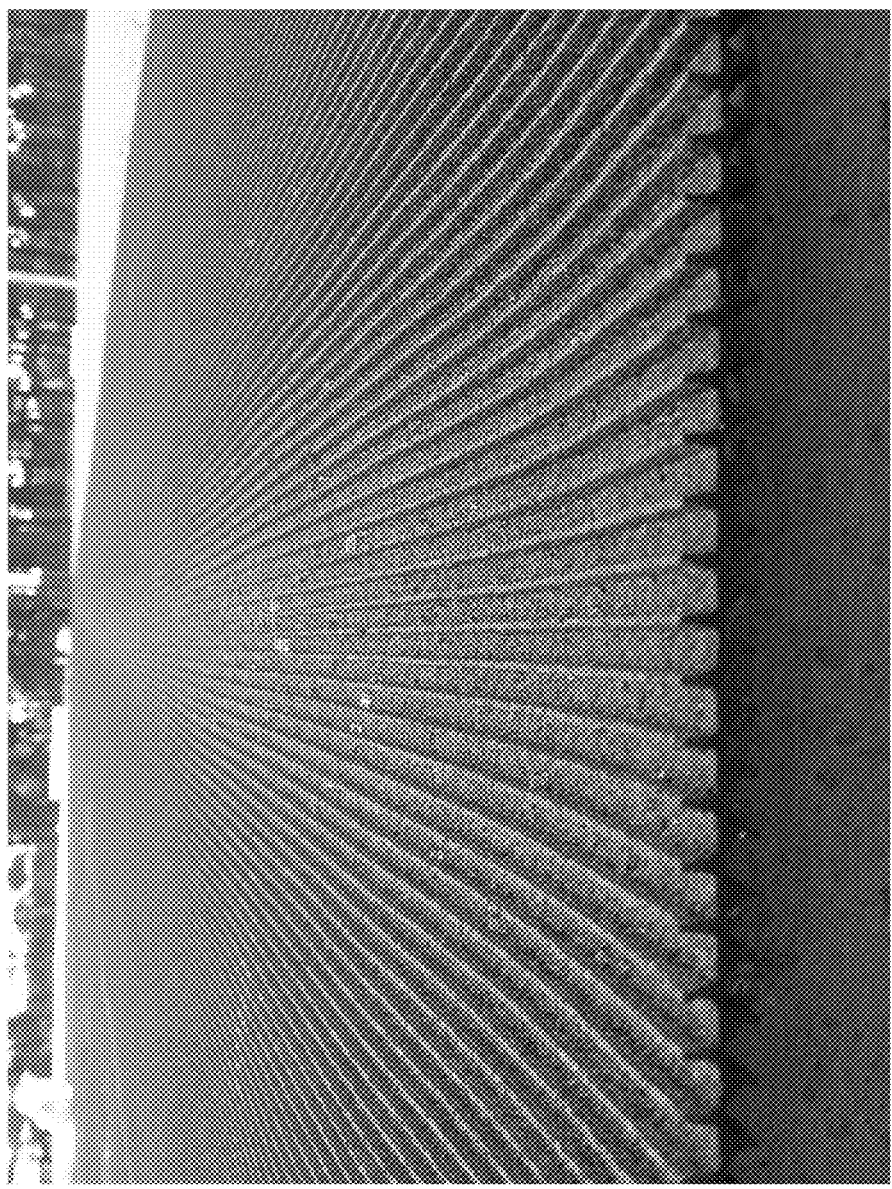

The lower parallel ridges 106 can have a variety of geometries. In one embodiment, the lower parallel ridges 106 have substantially identical profiles. In one embodiment, the profiles approximate and/or terminate in a triangle as depicted in FIGS. 1A, 1B, and 2B. The triangle can be an isosceles triangle, preferably in which both angles relative to the substrate 102 are identical or substantially identical. In one embodiment, the two downward-sloping faces of the triangular profile meet at a 60° angle. In other embodiments, the lower parallel ridges 106 have a substantially rectangular profile as depicted in FIGS. 1C and 1G or a beveled profile as depicted in FIG. 1E.

Although distinct upper parallel ridges 104 and lower parallel ridges 106 are depicted in many of the drawings herein, other embodiments have identical parallel ridges on both sides of a substrate 102, only have ridges on one side of a substrate, or do not have any ridges.

The upper parallel ridges 104 can be offset from the lower parallel ridges 106 so that substrate 102 under the upper parallel ridges 104 can deflect, bend, or sag to absorb impact applied to the upper parallel ridges 104. Alternatively, the upper parallel ridges 104 can be positioned over the lower parallel ridges 106.

As a result of the design features described herein, this embodiment of an impact-absorbing pad achieves the same impact attenuation (Gmax) as conventional pads having three times the thickness.

Figure 1H:
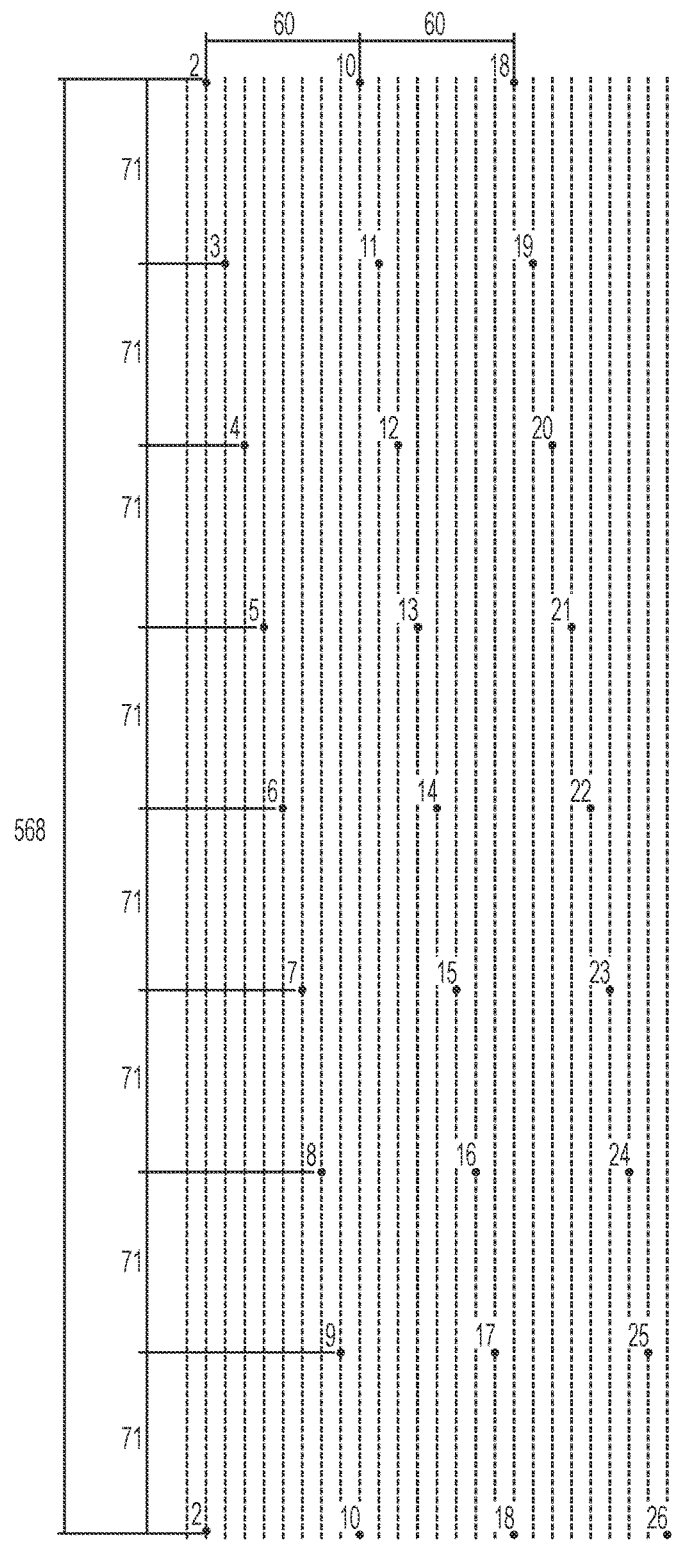
FIGS. 1H and 1I depict top views of pads having staggered drainage notches according to an embodiment of the invention.
Figure 1I:
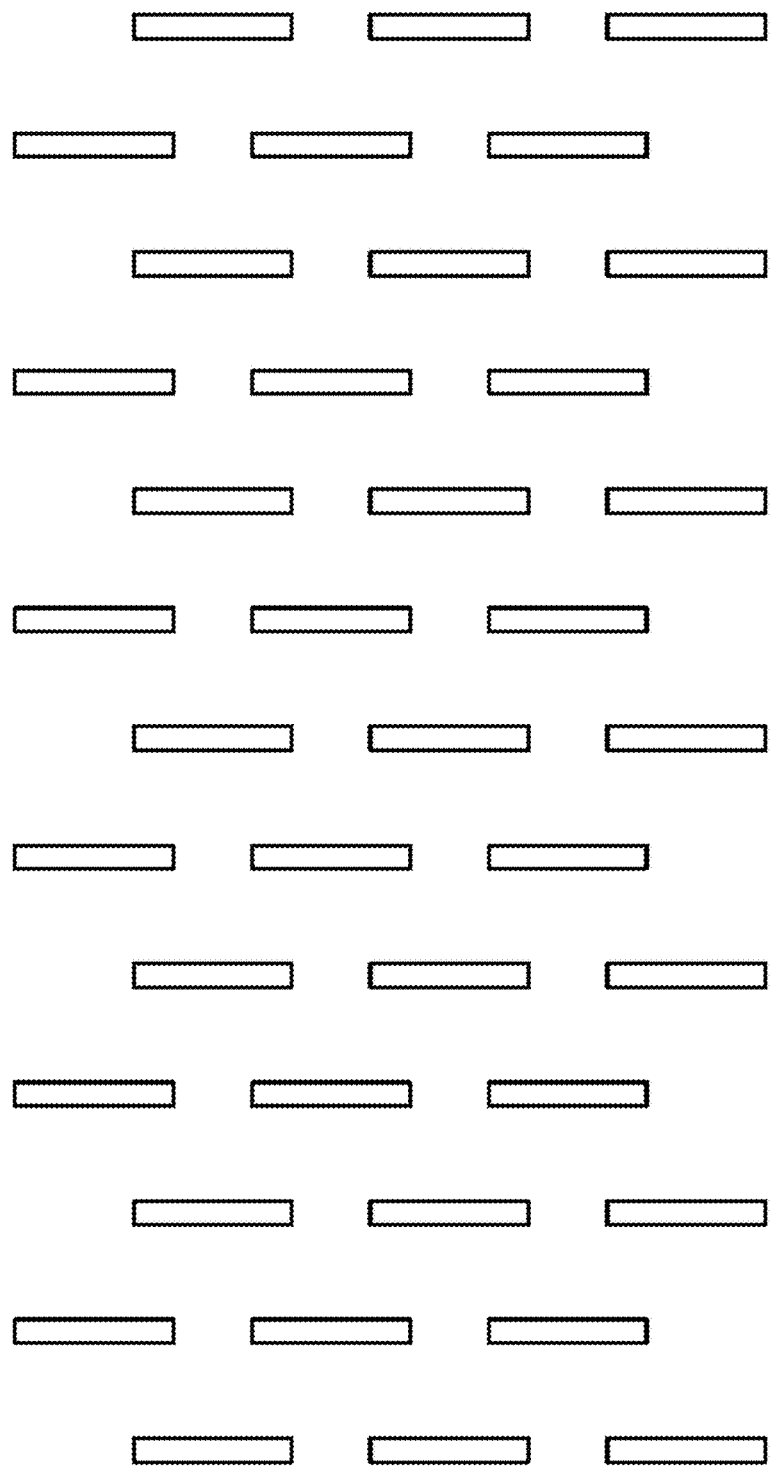
Figure 1J:
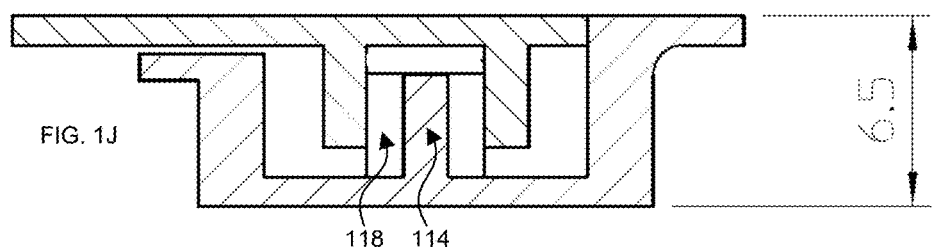
FIG. 1J and 1K depict top and side cross-sectional views of pad seams according to an embodiment of the invention.
Figure 1K:
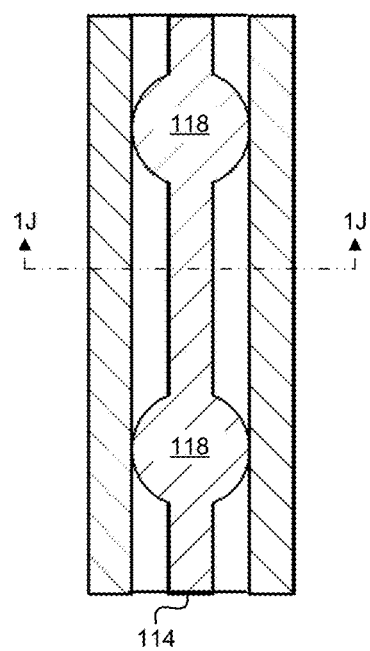

Referring to FIGS. 1A, 1D-1F, 1J, and 1K, the pad 100 can include one or more complementary edges 112, adapted and configured for coupling with another pad. Preferably, the joined edges have the same height when coupled as the upper parallel ridges 104. In one embodiment, a male edge 112a includes one or more ridges 114a, 114b that are adapted and configured to engage with one or more complementary grooves 116a, 116b on a female edge 112b. The ridges 114a, 114b and/or grooves 116a, 116b can be outwardly angled as depicted in FIGS. 1A and 1D. In another embodiment, the ridges 114 can include one or more bosses 118 as depicted in FIGS. 1J and 1K.

In one embodiment of the invention, the pad 100 is impermeable or substantially impermeable to water and is useful in the construction of artificial playing surfaces and in the construction of flooring and walls. Additionally or alternatively, the pad's resistance to moisture and configurability of ridges 104, 106 make the pad suitable for a lightweight replacement for heavy cementitious backer board used as a substrate for tile surfaces or for use as an underlayment for patio stones or pavers.

In some embodiments, one or more drainage holes are provided through the substrate for drainage through the pad. In other embodiments, one or more notches are periodically provided along one or more of the ridges in order to allow fluid to cross between the ridges in the event that a groove between two ridges becomes blocked or restricted. FIG. 1H depicts one embodiment of such a pad in which notches are staggered across ridges and are positioned at about 568 cm intervals on any ridge. FIG. 1I depicts another embodiment of the invention in which notches are provided at more regular intervals (e.g., with every other ridge broken) in certain lateral positions.

Figure 3A:
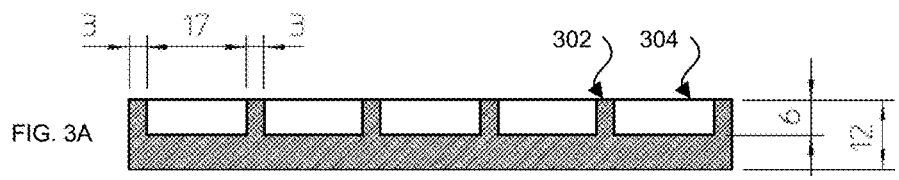
FIGS. 3A-3C depict pads having intersecting ridges according to an embodiment of the invention.
Figure 3B:
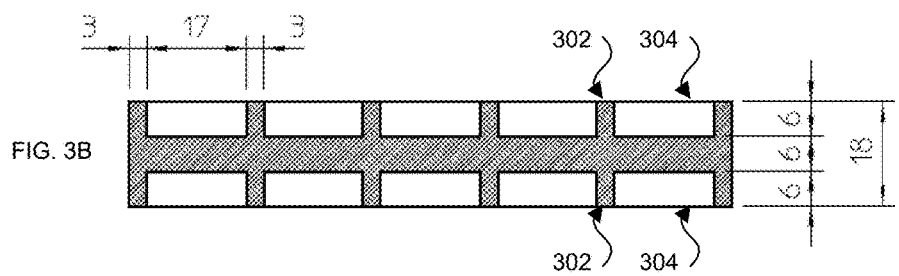
Figure 3C:
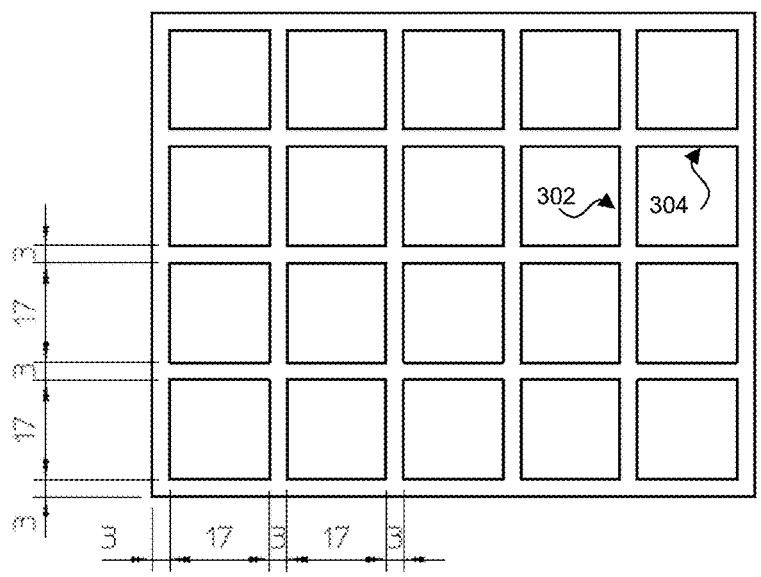

Referring now to FIGS. 3A-3C, another embodiment of the invention provides intersecting ridges 302, 304 that can form a waffled profile on one or more surfaces of a pad. Such embodiments may be particularly useful for interior applications where drainage is not required, but where sound insulation is desired. Various notches and holes can be provided through the ridges 302, 304 and/or the pad as described herein to facilitate drainage and/or ventilation.

The pad can be extruded or can be manufacturing using molding, machining, or other techniques.

In one embodiment, the pad comprises a polymer such as a polyolefins (e.g., polyethylene, polypropylene, polymethylpentene, polybutene-1, polyisobutylene, ethylene propylene rubber, ethylene propylene diene rubber, and the like), acrylonitrile-butadiene rubber, hydrogenated acrylonitrile-butadiene rubber, fluorocarbon rubber, perfluoroelastomer, silicone rubber, fluorosilicone rubber, chloroprene rubber, neoprene rubber, polyester urethane, polyether urethane, natural rubber, polyacrylate rubber, ethylene acrylic, styrene-butadiene rubber, ethylene oxide epichlorodrine rubber, chlorosulfonated polytethylene, butadiene rubber, isoprene rubber, butyl rubber, and the like.

In one embodiment, the pad is a composite such as a polymeric composite. Suitable matrices include resins such as polyolefins (e.g., polyethylene). Suitable reinforcements include recycled materials such as post-consumer tire particles, engineered recycled rubber particles (ERRP), and the like.

The dimensions and/or properties of the pad can be configured to facilitate various form factors. For example, the pad can be delivered in a roll that can be unrolled and coupled to other unrolled pads to underlay an artificial turf surface. Such embodiments can be sufficiently compliant to lay flat and/or conform to the underlying prepared surface, which may be crowned, sloped, or have irregularities. In other embodiments, the pad can be provided as relatively stiff sheets (e.g., 4'×4' or 4'×8' sheets) for mounting on a wall (e.g., with screws, nails, or other fasteners) prior to covering with wallboard (e.g., drywall, plasterboard, blueboard, and the like), tile, or other surfaces.

Embodiments of the invention can contain or contain attachment points, grooves, or channels for accommodating heating and/or cooling elements. Exemplary elements include cross-linked polyethylene (PEX) tubing or copper tubing through which a heated or cooled fluid flows and Ohmic or resistive heating elements such as wires through which electricity flows.

Although embodiments of the invention have been described in the context of impact absorbing pads, the principles described herein can be utilized in other applications such as residential, commercial, or industrial flooring underlayment, soundproofing, artificial turf for landscaping, wrapping of non-leaking pipeline defects, impermeable barriers for use in "green roofs" that are partially completely covered with vegetation, ground protection during construction, oil and gas drilling, and the like. For example, embodiments of the pads described herein can be placed over piping and conduit to protect against corrosion from poured concrete and can be placed under poured concrete slabs or on walls to provide insulation, soundproofing, and a vapor barrier.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:

1. An artificial turf, patio stone, paver, or flooring underlayment pad comprising:
    an extruded polymeric substrate;
    a first plurality of at least three parallel deformable ridges extending perpendicularly from a first side of the extruded polymeric substrate;
    alternating bevels along a terminal edge of the first plurality of parallel deformable ridges; and
    a second plurality of parallel ridges extending from a second side of the extruded polymeric substrate;
    wherein the first plurality of parallel deformable ridges are offset from the second plurality of parallel ridges so that the extruded polymeric substrate under the first plurality of ridges can deflect to absorb a load applied to one or more of the first plurality of parallel ridges.

2. The pad of claim 1, wherein the second plurality of parallel ridges have substantially identical profiles terminating in an isosceles triangle.

3. The pad of claim 2, wherein the isosceles triangle is an equilateral triangle.

4. The pad of claim 1, wherein the pad is sufficiently compliant so as to lie against an underlying surface.

5. The pad of claim 1, wherein the pad is sufficiently compliant so as to conform to an underlying surface.

6. The pad of claim 1, wherein at least one of the first plurality of parallel deformable ridges and second plurality of parallel ridges include periodic breaks allowing water to traverse the ridges.

* * * * *